(12) United States Patent
Reisdorf et al.

(10) Patent No.: US 7,179,558 B2
(45) Date of Patent: Feb. 20, 2007

(54) BRAZE ALLOY CONTAINING PARTICULATE MATERIAL

(75) Inventors: Gary F. Reisdorf, Penfield, NY (US); Karl J. Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 112 days.

(21) Appl. No.: 10/892,591

(22) Filed: Jul. 15, 2004

(65) Prior Publication Data
US 2006/0014055 A1      Jan. 19, 2006

(51) Int. Cl.
*H01M 8/00* (2006.01)

(52) U.S. Cl. .................. 429/30; 429/31; 429/35; 429/36

(58) Field of Classification Search .......... 428/457; 228/122.1, 903; 429/12, 30, 31, 35, 36
See application file for complete search history.

(56) References Cited

U.S. PATENT DOCUMENTS

| | | | |
|---|---|---|---|
| 3,900,153 A | 8/1975 | Beerwerth et al. | |
| 3,918,922 A | 11/1975 | Anderson et al. | |
| 4,731,130 A | 3/1988 | O'leary et al. | |
| 4,932,582 A | 6/1990 | Une et al. | |
| 5,830,292 A | 11/1998 | Eiter et al. | |
| 6,390,354 B1* | 5/2002 | Makino et al. | ............. 228/189 |
| 6,877,651 B2* | 4/2005 | Sandin | ..................... 228/122.1 |
| 2002/0125300 A1* | 9/2002 | Ishikawa et al. | ......... 228/122.1 |

FOREIGN PATENT DOCUMENTS

| | | |
|---|---|---|
| EP | 0937536 | 8/1999 |
| GB | 1112693 | 5/1968 |
| WO | 90/04490 | 5/1990 |
| WO | WO 03/059843 A1 | 8/2003 |

OTHER PUBLICATIONS

EP search report dated Nov. 14, 2005.

* cited by examiner

*Primary Examiner*—Ngoclan T. Mai
(74) *Attorney, Agent, or Firm*—Paul L. Marshall

(57) ABSTRACT

A minimum joint thickness can be assured by incorporating beads or particles having a diameter corresponding to the joint thickness desired and which are infusible at the brazing temperature. Preferably such particles are formed of high-melting metals, metal oxides, ceramics, or cermets and are mixed into the alloy paste prior to fusing. In a preferred embodiment, the particle-containing paste is mixed with a non-flux carrier to facilitate application to the elements to be brazed. Exemplary application methods may include painting, rolling, screening, or extrusion dispensing. Brazing alloys in accordance with the invention are useful in bonding ceramics to ceramics, ceramics to metals, and metals to metals.

19 Claims, 1 Drawing Sheet

BRAZE ALLOY CONTAINING PARTICULATE MATERIAL

TECHNICAL FIELD

The present invention relates to alloys for joining metal materials by brazing; more particularly, to silver-containing braze alloys for joining ceramics to metals; and most particularly, to silver braze alloys containing non-fusible particles to control joint thickness during fusing of the alloy.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide, such as yttrium-stabilized zirconium (YSZ). Such a fuel cell is known in the art as a "solid oxide fuel cell" (SOFC). A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells.

In a currently-preferred arrangement, each ceramic-based fuel cell is bonded to a surrounding metal "cassette" frame to form a fuel cell sub-assembly, using a silver/copper-based braze. As the solid braze alloy is liquefied, the copper is rapidly oxidized to form copper oxide which separates from the alloy, leaving essentially pure silver as the brazing material. The copper oxide migrates to the boundaries of the liquid and adheres to the ceramic and the metal, providing an attachment layer for the silver. Exemplary silver/copper and silver/vanadium braze alloys are disclosed in International Publication No. WO 03/059843, published 24 Jul. 2003, which is incorporated herein by reference.

A problem in the use of such alloys is that the liquidus range of the alloy is very small, such that the alloy tends immediately to become very runny upon melting and is easily squeezed out of a mechanical joint, leaving a weak bond which is easily fractured. This is known in the art of bonding as a "dry joint." Further, the alloy displaced from the joint can flow onto adjacent areas of the apparatus being brazed, such as a fuel cell assembly, which can lead to electrical shorts during later attempted use of the apparatus. In addition, if the joint gap is too large due to insufficient loading or an out-of-flatness condition of the mating parts, the braze alloy will not fill the gap.

A known approach to the problem of retaining liquid braze in a joint is to provide one or both of the surfaces to be brazed with shallow dimples such that the local joint thickness at each dimple will be increased. This approach is less than satisfactory in some applications, in that the braze layer is thickened only in the regions of the dimples, rather than over the entire joint, and in that it may be undesirable or impossible to provide the required dimples on some surfaces to be brazed.

What is needed in the art is a means for maintaining a minimum joint thickness of a brazing alloy when brazing mating planar surfaces, and for reducing the tendency of the liquefied alloy to be squeezed from such a joint.

It is a principal object of the present invention to maintain a minimum joint thickness of a brazing alloy, to reduce the tendency of the liquefied alloy to flow from a joint, and to allow an additional load to be applied to the joint to maintain a minimum gap and/or to flatten the adjoining parts without causing a dry joint.

SUMMARY OF THE INVENTION

Briefly described, a minimum joint thickness can be assured, and liquid braze can be discouraged from running out of a joint, by incorporating into the braze material beads or particulates having a diameter corresponding to the minimum joint thickness desired and which are infusible at the brazing temperature. For example, in brazing SOFC fuel cell components, a desirable braze joint thickness is in the range of about 30 µm to about 50 µm. When infusible particles in that size range are incorporated into the braze alloy, the joint thickness is assured. Preferably such particles are formed of high-melting metals, metal oxides, ceramics, or cermets. Preferably, the particles are mixed into an alloy paste prior to fusing. In a preferred embodiment, the particle-containing paste is mixed with a non-flux carrier to facilitate application to the surfaces to be brazed. Exemplary application methods may include painting, rolling, screening, or extrusion dispensing. Brazing alloys in accordance with the invention are useful in bonding ceramics to ceramics, ceramics to metals, and metals to metals.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
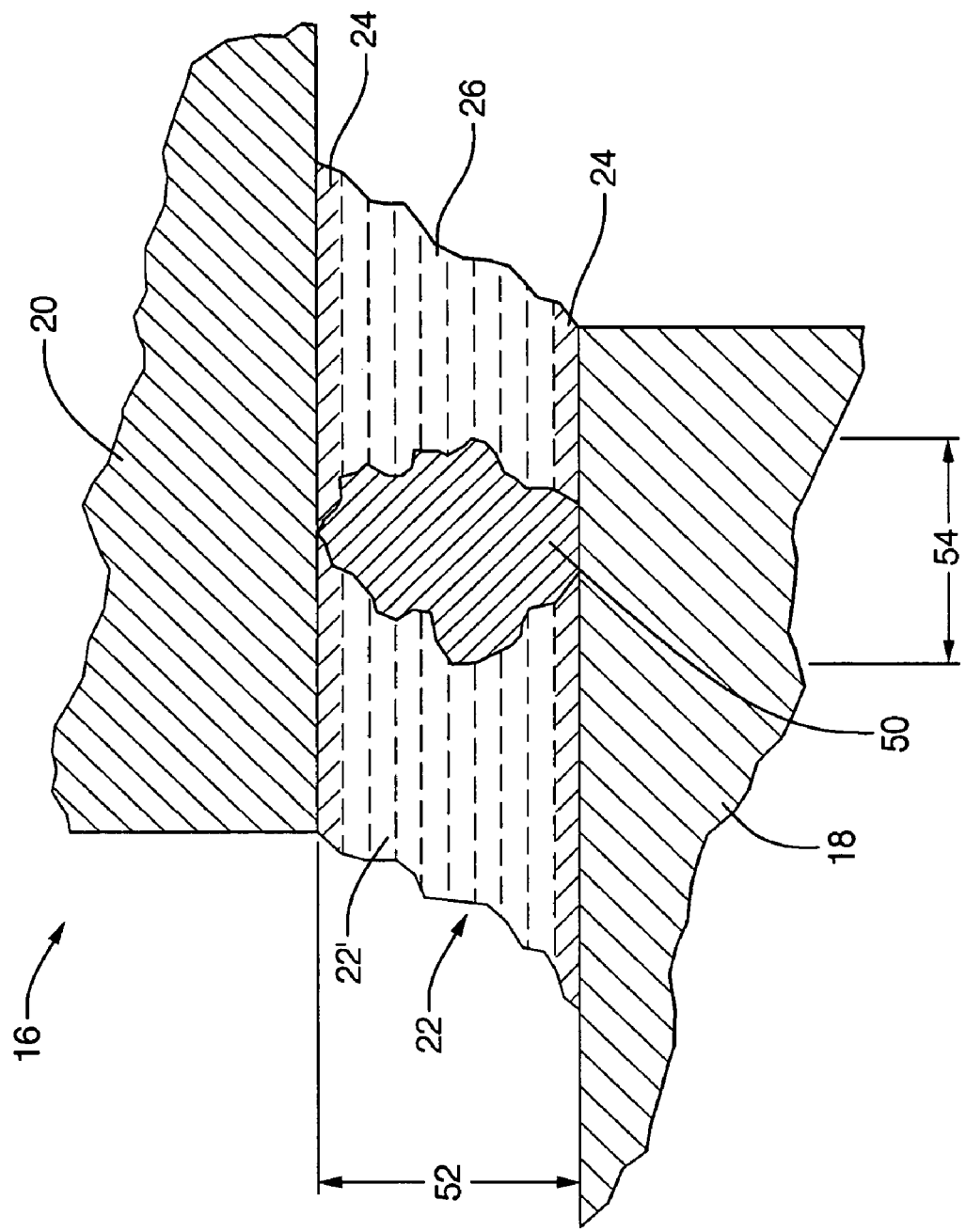
FIG. 1 is a cross-sectional view of a portion of a fuel cell, showing bonding of a ceramic component to a metal component by a braze alloy incorporating particulates in accordance with the invention.

Referring to FIG. 1 in a solid-oxide fuel cell assembly 16, a ceramic-based fuel cell element 18 is bonded to a metal cassette 20 by a braze seal formed of a braze alloy 22 in accordance with the invention. Preferably, the braze alloy comprises silver and includes either copper or vanadium which is readily oxidized to form CuO or $V_2O_5$ during fusion of the alloy in an oxidizing atmosphere. The oxides separate from the alloy in known fashion and provide an adhesion layer 24 on element 18 and cassette 20 for attachment of the remaining alloy 26.

Braze alloy 22 includes a plurality of particles typified by particle 50, the particles being distributed throughout the alloy matrix 22' and having a general diameter 52 equal to the desired thickness of the braze seal. Particles 50 thus act as shims or spacers to assure a desired seal thickness by limiting the degree to which molten braze may be extruded from the seal space. Of course, particle 50 may be irregular in shape, as shown, and may have a shorter diameter 54 which if oriented across the seal between elements 18 and 20 can result in a thinner seal; however, particles 50 preferably are selected such that, even if they are irregular and not preferentially orientable, the shortest diameter 54 will still provide a desired minimum thickness or seal. Of course, particles 50 may be provided as spherical beads (not shown), having a constant diameter equal to the desired seal thickness.

Particles or beads 50 may be formed in known fashion from metals, metal alloys, ceramics, and cermets, provided that the melting point of the material is sufficiently high that the particles are not fusible in the brazing range of temperatures. The melt temperature of the particles should be at least 50° C. higher than the brazing temperature range. For silver braze alloys, the melt temperature of the particles should preferable be above 1050° C. Such particulated alloys in accordance with the invention are especially useful in brazing metal and ceramic components of a solid-oxide fuel cell assembly.

For application to surfaces to be brazed, particulated alloys may be formed by mixing alloy powder or paste with an amount of the particulate material which has been previously comminuted and sorted to provide only particles in the desired size range or smaller. The particulate/alloy mixture may then be mixed with an evanescent non-flux carrier (not shown), for example, Ferro A149-19-15, available from Ferro Corp., Cleveland, Ohio, USA, to form a particulated slurry which is readily applied by known methods, for example, brushing, rolling, spraying, screening, or extrusion dispensing.

Preferably, a brazed joint is formed by:

a) applying a particulated slurry in accordance with the invention to one or both of the surfaces to be brazed;

b) engaging, under clamping pressure, the surfaces to be brazed; and c) heating the clamped assembly above the braze alloy liquidus temperature to fuse the fusible metal, drive off the evanescent carrier, and collapse the joint until further collapse is prevented by the infusible particulates contained in the particulated braze alloy. The included particles can allow a higher clamping load to flatten adjoining parts to form a minimum gap providing an optimal joint thickness throughout the joint.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly comprising a ceramic component and a metal component wherein said ceramic and metal components are bonded by a particulated braze alloy, wherein said particulates in said braze alloy have at least one diameter, and wherein said braze alloy has a thickness substantially equal to said at least one diameter.

2. A fuel cell assembly in accordance with claim 1 wherein said fuel cell assembly comprises a solid oxide fuel cell.

3. A fuel cell assembly in accordance with claim 1 wherein said diameter is between about 30 μm and about 50 μm.

4. A fuel cell assembly in accordance with claim 1 wherein said particulates are formed of a material selected from the group consisting of metals, metal alloys, ceramics, and cermets.

5. A fuel cell assembly in accordance with claim 1 wherein the shape of said particulates in said braze alloy is selected from the group consisting of irregular and spherical.

6. A fuel cell assembly in accordance with claim 1 wherein said braze alloy includes silver.

7. A fuel cell assembly in accordance with claim 1 wherein said braze alloy includes an element selected from the group consisting of copper and vanadium.

8. A fuel cell assembly in accordance with claim 1 wherein a brazing temperature range of said braze alloy is between about 900° C. and about 1000° C.

9. A fuel cell assembly in accordance with claim 1 wherein the melting temperature of said particulates in said braze alloy is at least about 50° C. higher than a brazing temperature range of said braze alloy.

10. A fuel cell assembly in accordance with claim 9 wherein said brazing temperature range of said braze alloy is between about 900° C. and about 1000° C.

11. A fuel cell assembly in accordance with claim 1 wherein said braze alloy includes an evanescent non-flux carrier.

12. A fuel cell assembly comprising a ceramic component and a metal component wherein said ceramic and metal components are bonded by a braze alloy including at least one particle, wherein said particle has at least one diameter, and wherein said braze alloy has a thickness substantially equal to said at least one diameter.

13. A fuel cell assembly in accordance with claim 12 wherein said diameter is between about 30 μm and about 50 μm.

14. A fuel cell assembly in accordance with claim 12 wherein said particle is formed of a material selected from the group consisting of metal, metal alloy, ceramic, and cermet.

15. A fuel cell assembly in accordance with claim 12 wherein the shape of said particle in said braze alloy is selected from the group consisting of irregular and spherical.

16. A fuel cell assembly in accordance with claim 12 wherein the melting temperature of said particle is at least about 50° C. higher than a brazing temperature range of said braze alloy.

17. A fuel cell assembly comprising a ceramic component and a metal component wherein said ceramic and metal components are bonded by a particulated braze alloy, wherein said particulate material is infusible within a brazing temperature range of said braze alloy, wherein said particulate material has a diameter, and wherein said braze alloy has a thickness substantially equal to said diameter of said particulate material.

18. A fuel cell assembly in accordance with claim 17 wherein the melting temperature of said particulate material is at least about 50° C. higher than said brazing temperature range of said braze alloy.

19. A fuel cell assembly in accordance with claim 17 wherein said brazing temperature range of said braze alloy is between about 900° C. and about 1000° C.

* * * * *

UNITED STATES PATENT AND TRADEMARK OFFICE
CERTIFICATE OF CORRECTION

PATENT NO.         : 7,179,558 B2
APPLICATION NO.    : 10/892591
DATED              : February 20, 2007
INVENTOR(S)        : Haltiner et al.

It is certified that error appears in the above-identified patent and that said Letters Patent is hereby corrected as shown below:

Col. 1, line 4, after title the first line of the patent should state:

>    This invention was made with Government support under
>    DE-FC26-02NT41246 awarded by DOE.
>    The Government has certain rights in this invention.

Signed and Sealed this

Twenty-first Day of April, 2009

JOHN DOLL
*Acting Director of the United States Patent and Trademark Office*